United States Patent
Wang et al.

(10) Patent No.: US 9,116,375 B2
(45) Date of Patent: Aug. 25, 2015

(54) CONNECTION STRUCTURE FOR PANEL AND FRAME, AND HOLDING MEMBER DEVICE THEREOF

(71) Applicant: Shenzhen China Star Optoelectronics Technology Co., Ltd., Shenzhen, Guangdong (CN)

(72) Inventors: Lifeng Wang, Shenzhen (CN); Yuchun Hsiao, Shenzhen (CN); Yi-cheng Kuo, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 348 days.

(21) Appl. No.: 13/807,005

(22) PCT Filed: Nov. 30, 2012

(86) PCT No.: PCT/CN2012/085602
§ 371 (c)(1),
(2) Date: Dec. 26, 2012

(87) PCT Pub. No.: WO2014/079093
PCT Pub. Date: May 30, 2014

(65) Prior Publication Data
US 2014/0139782 A1    May 22, 2014

(30) Foreign Application Priority Data

Nov. 20, 2012 (CN) .......................... 2012 1 0472331

(51) Int. Cl.
G02F 1/1333    (2006.01)
F16B 5/12      (2006.01)
F16B 5/06      (2006.01)

(52) U.S. Cl.
CPC .......... *G02F 1/133308* (2013.01); *F16B 5/121* (2013.01); *F16B 5/125* (2013.01); *F16B 5/0642* (2013.01); *G02F 2201/465* (2013.01); *Y10T 403/7176* (2015.01)

(58) Field of Classification Search
CPC .......... G02F 1/133308; G02F 2201/46; G02F 2201/465
USPC ..................................... 349/58–60
See application file for complete search history.

(56) References Cited

U.S. PATENT DOCUMENTS 8,579,493 B2 * 11/2013 Kawabata et al. ............ 362/633
2010/0296022 A1 * 11/2010 Ando .............................. 349/58

FOREIGN PATENT DOCUMENTS

WO    WO2012014318 A1    2/2012

*Primary Examiner* — Richard Kim
*Assistant Examiner* — Kendrick Hsu
(74) *Attorney, Agent, or Firm* — Andrew C. Cheng

(57) ABSTRACT

The present invention provides a connection structure for panel and frame and holding member thereof. The connection structure includes a panel and a frame supporting the panel. The panel and the frame use a plurality of holding members to fix and hold. The holding member includes a presser and a connection part extending from one side of the presser. The connection part includes a first extension part and a second extension part. The first extension part and the second extension part connect a corresponding connection element on the side of the frame. As such, the present invention saves the front frame and fixes a liquid crystal panel and a frame of a liquid crystal module to reduce the transportation risk, protect the liquid crystal panel from damage, simplify the overall assembly structure of the liquid crystal module and reduce the assembly cost.

14 Claims, 5 Drawing Sheets

CONNECTION STRUCTURE FOR PANEL AND FRAME, AND HOLDING MEMBER DEVICE THEREOF

BACKGROUND OF THE INVENTION

1. Field of the Invention

The present invention relates to the field of a connection structure for panel and frame, and holding member thereof, and in particular to a connection structure for liquid crystal panel and frame for supporting the liquid crystal panel, and holding member thereof.

2. The Related Arts

As the progression of technology and versatile demands, computer and TV are becoming integrated, such as, so-called all-in-one PCTV. FIG. 1 is a schematic view of a structure of liquid crystal module of a know all-in-one PCTV. The liquid crystal module 900 comprises a front frame 901, a liquid crystal panel 902, a mold frame 903 and a backlight module 904. The mold frame 903 is fixed to the backlight module 904 and can carry the liquid crystal panel 902. The front frame 901 is for fixing the liquid crystal panel 902 to the backlight module 904.

The known all-in-one PCTV is usually assembled in TV factory. However, as the cost decreasing, the liquid crystal module without front frame has become a choice of many TV manufacturers for cost reduction, which requires the liquid crystal module manufacturer to ship the liquid crystal module without front frame to TV manufacturers. A potential risk is that, without the fixation and protection of the front frame, the liquid crystal panel is at risk of damage during transportation. Therefore, it is desirable to solve the transportation issue.

SUMMARY OF THE INVENTION

The technical issue to be addressed by the present invention is to provide a connection structure for liquid crystal panel and frame, and holding member device thereof, to save the front frame and simplify the overall assembly structure of the liquid crystal module, as well as reduce the assembly cost.

The present invention provides a connection structure for liquid crystal panel and frame, which comprises: a panel and a frame supporting the panel, characterized in that: the panel and the frame using a plurality of holding members to fix and hold, the holding member comprising a presser and a connection part extending from one side of the presser, the presser fixing and pressing the panel embedded in the frame, and the connection part connecting a corresponding connection element on the side of the frame.

According to a preferred embodiment of the present invention, the connection part further comprises a first extension part and a second extension part: wherein the first extension part is disposed with via hole, and the second extension part is disposed with a hook opening, the connection element on the side of the frame correspondingly comprises: a fixing hole and a hook, the via hole and the fixing hole are connected through a fixing element, and the hook opening and the hook are correspondingly fixed and connected.

According to a preferred embodiment of the present invention, the first extension part further comprises a positioning hole and the connection element on the side of the frame correspondingly comprises a positioning pillar, and the positioning pillar and the positioning hole are positioned and connected.

According to a preferred embodiment of the present invention, the first extension part and the presser are at a same level, and the second extension part and the first extension part form a default angle.

According to a preferred embodiment of the present invention, the default angle is between 75°-90°.

The present invention provides a holding member of a connection structure, for fixing and holding a panel and a frame, characterized in that the holding member comprising: a presser and a connection part extending from one side of the presser, the presser fixing and pressing the panel embedded in the frame, and the connection part connecting a corresponding connection element on the side of the frame.

According to a preferred embodiment of the present invention, the connection part further comprises a first extension part and a second extension part: wherein the first extension part is disposed with via hole, and the second extension part is disposed with a hook opening, the connection element on the side of the frame correspondingly comprises: a fixing hole and a hook, the via hole and the fixing hole are connected through a fixing element, and the hook opening and the hook are correspondingly fixed and connected.

According to a preferred embodiment of the present invention, the first extension part further comprises a positioning hole and the connection element on the side of the frame correspondingly comprises a positioning pillar, and the positioning pillar and the positioning hole are positioned and connected.

According to a preferred embodiment of the present invention, the first extension part and the presser are at a same level, and the second extension part and the first extension part form a default angle.

According to a preferred embodiment of the present invention, the default angle is between 75°-90°.

The efficacy of the present invention is that to be distinguished from the state of the art. On the premises of saving the front frame, the present invention provides a connection structure for panel and frame, and holding member thereof to fix a liquid crystal panel and a frame of a liquid crystal module to reduce the transportation risk and protect the liquid crystal panel from damage. As such, the present invention simplifies the overall assembly structure of the liquid crystal module as well as reduces the assembly cost.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

For description of the technical means and result of the present invention, the following refers to the drawings and embodiments for detailed description, wherein the same number indicates the same part.

The connection structure for panel and frame, and holding member thereof of the present invention are applicable to the liquid crystal displaying field. In the present embodiment, the panel is a liquid crystal panel and the frame is a mold frame.

Figure 4:
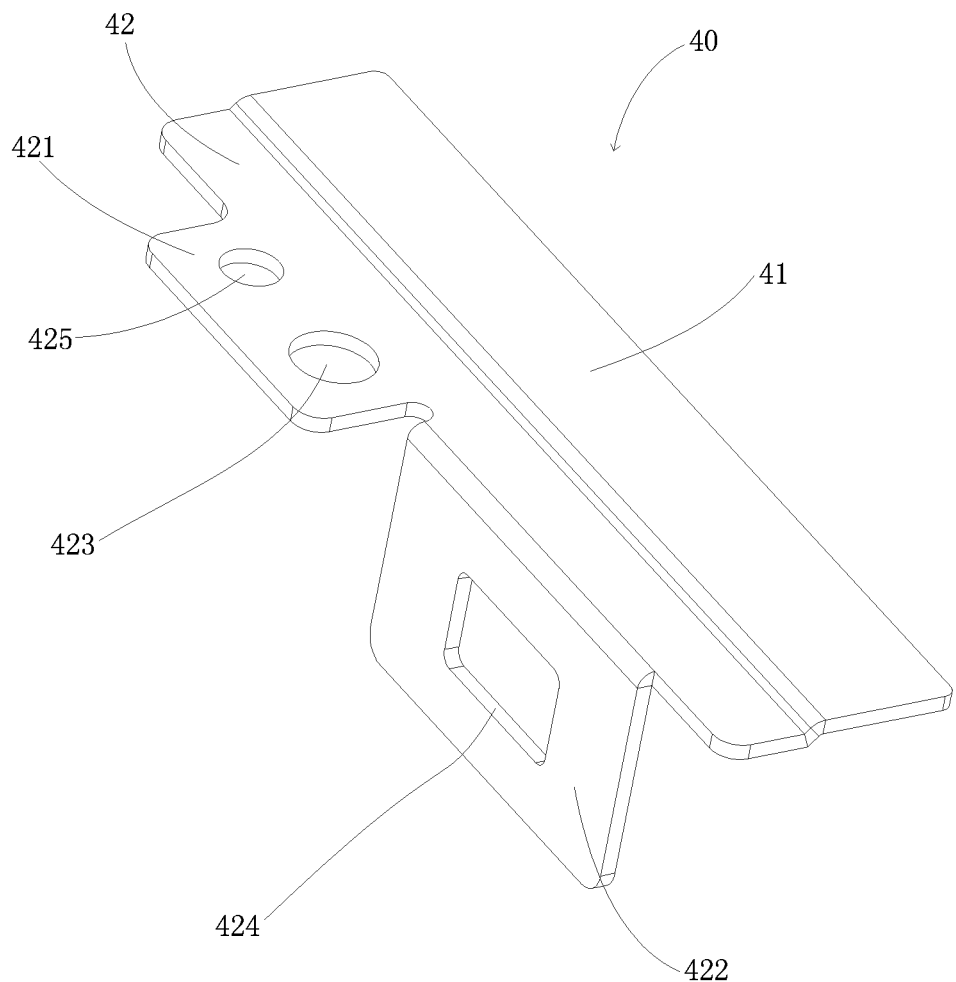
FIG. 4 is a schematic view showing the holding member structure according to an embodiment of the present invention.

Referring to FIG. 4, FIG. 4 is a schematic view showing the holding member structure according to an embodiment of the present invention.

Figure 1:
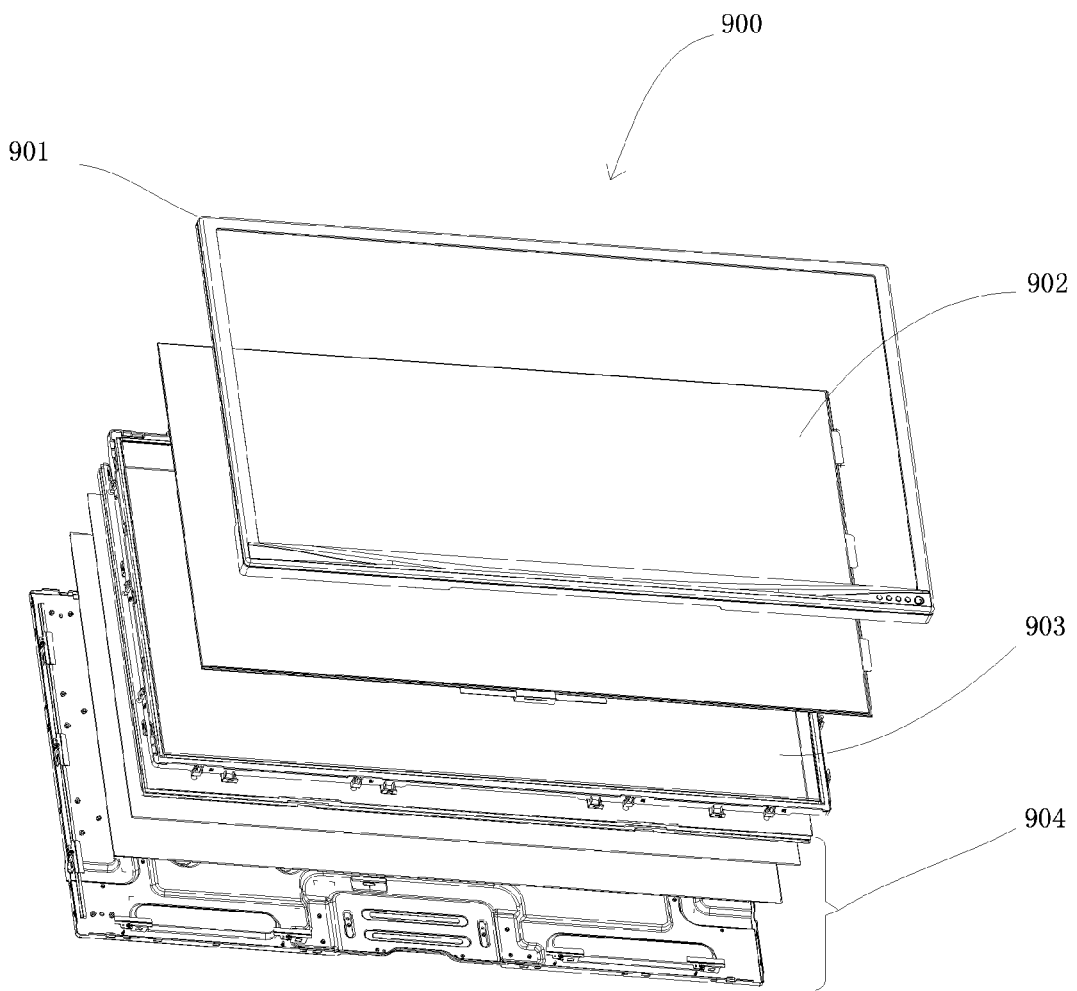
FIG. 1 is a schematic view showing a structure of liquid crystal module of a know all-in-one PCTV.
Figure 2:
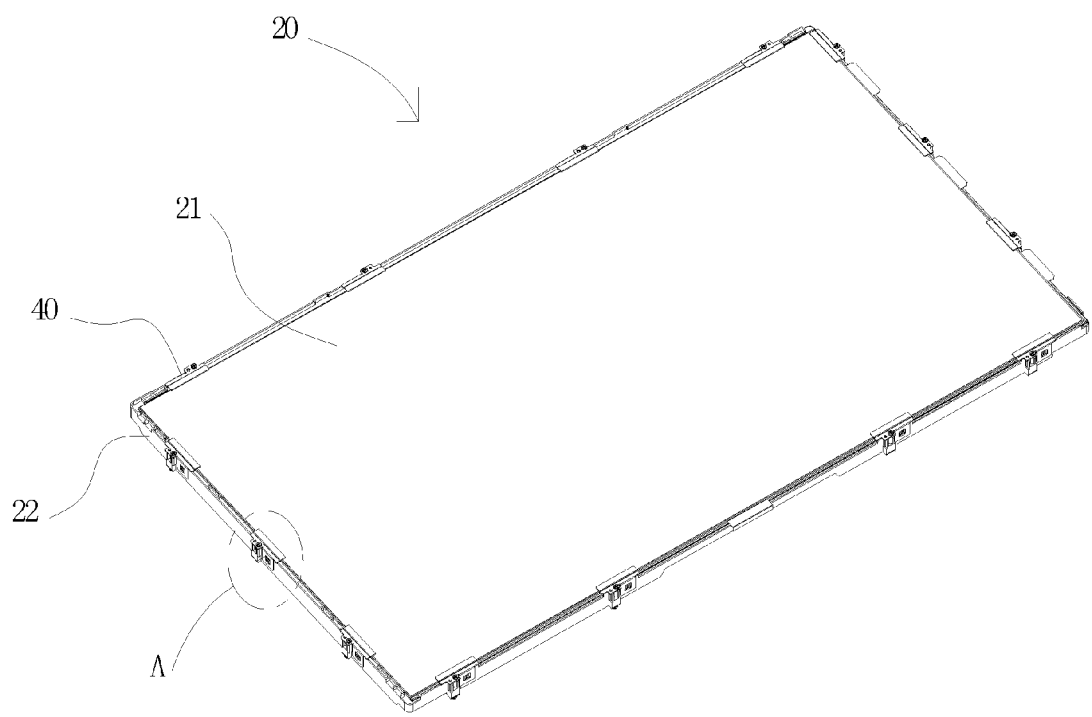
FIG. 2 is a schematic view showing the connection structure of liquid crystal panel and a mold frame according to an embodiment of the present invention.

As shown in FIG. 4, a holding member 40 of the present embodiment is applicable to fix and holding the liquid crystal panel 21 and mold frame 22 shown in FIG. 2. The holding member 40 comprises a presser 41 and a connection part 42 extending from one side of the presser 40. The presser 41 is for fixing and pressing the panel 21, and the connection part 42 is for connecting a corresponding connection element on the side of the mold frame 22.

The holding member 40 can be made of metal material or plastic material, such as, SECC, SGCC, PET, PBT, PC, and so on. The material used for holding member 40 must guarantee to fix and hold the liquid crystal panel 21 and the mold frame 22, as well as to prevent the presser 41 from damaging liquid crystal panel 21 when pressing on the liquid crystal panel 21.

One side of the presser 41 is extended to from a first extension part 421 and a second extension part 422. The first extension part 421 and the presser 41 are at a same level, and the second extension part 422 and the first extension part 421 form an angle so that the first extension part 421 and the second extension part 422 can better connect and fix the connection element on the side of the mold frame 22. The first extension part 421 is disposed with via hole 423, and the second extension part 422 is disposed with a hook opening 424, preferably a square opening. The first extension part 421 may further be disposed with a positioning hole 425, preferably a round hole. In addition, for convenient installation and good fixing and connection effect, the default angle between the second extension part 422 and the first extension part 421 is between 75°-90°, preferably, 90°.

Figure 5:
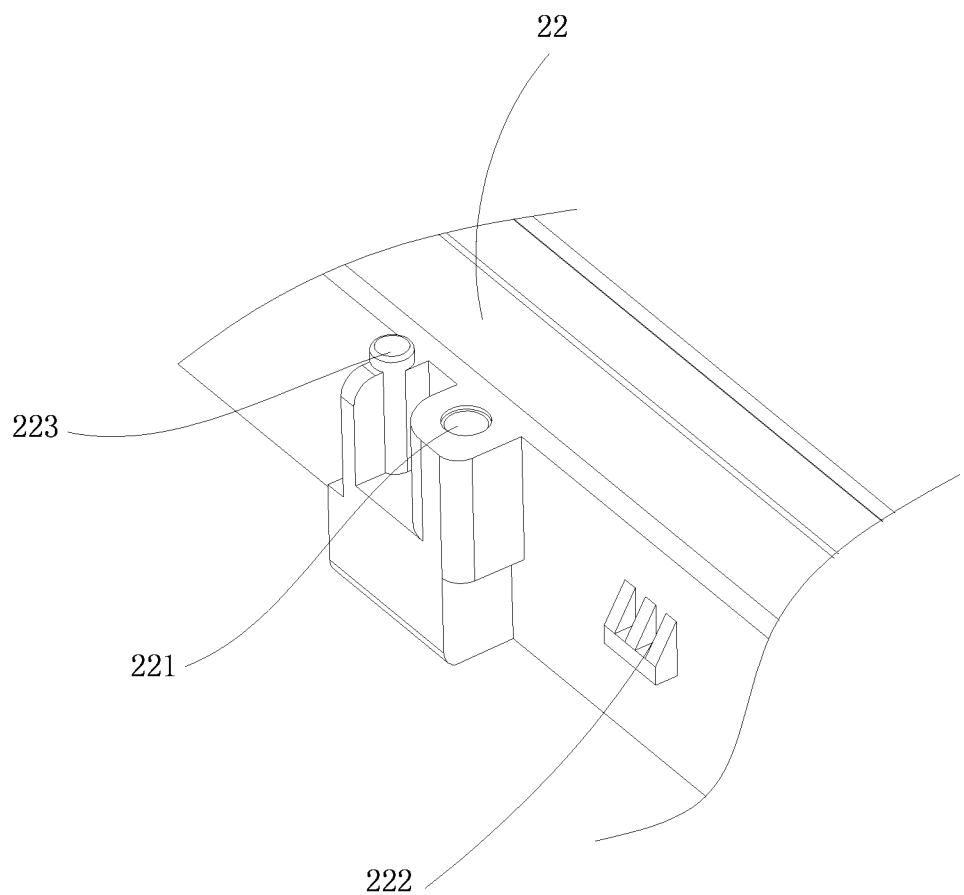
FIG. 5 is a schematic view showing the connection element structure on the side of the mold frame according to an embodiment of the present invention.

Referring to FIG. 5, FIG. 5 is a schematic view showing the connection element structure on the side of the mold frame according to an embodiment of the present invention.

Figure 3:
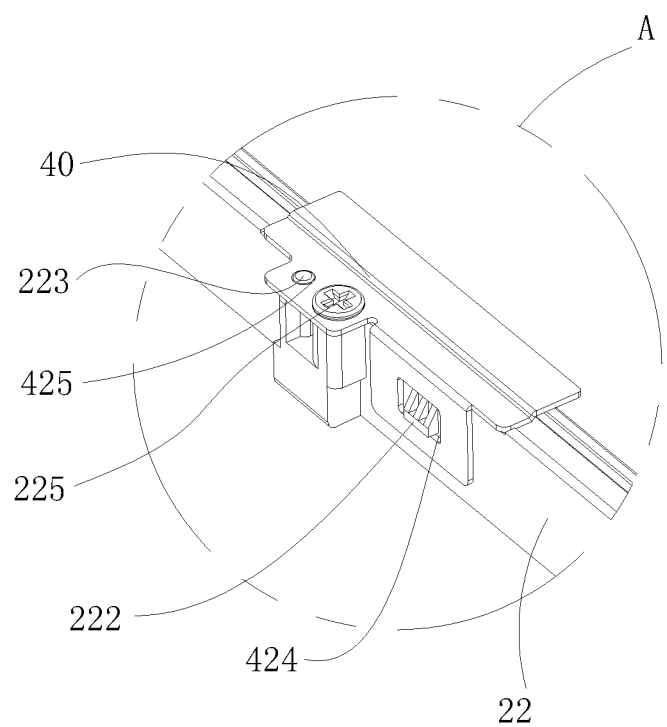
FIG. 3 is an enlarged view of part A shown in FIG. 2.

As shown in FIG. 5, the connection element on the side of the mold frame 22 comprises a fixing hole 221, a hook 222 and a positioning pillar 223. The fixing hole 221 is preferably a screw hole, and the top of the hole is at the same level as the surface of the mold frame 22. FIG. 3 shows a fixing element 225 is preferably a screw. The fixing element 225 passes the via hole 423 of FIG. 4 and enters fixing hole 221. The lower edge of the second extension part 224 of the holding member 40 shown in FIG. 4 contacts a slant surface of a hook and pushes outwards when installed downwards, until the hook is completely stuck inside the hook opening 424. The positioning pillar 223 is located vertically above the upper surface of the mold frame 22, with a height slightly higher than the upper surface of the mold frame 22 so that the positioning pillar 223 can passes precisely through the positioning hole 425 of the holding member 40 shown in FIG. 4. When fixed, the holding member 40 can be positioned precisely at the connection element on the side of the mold frame 22 for fixing.

Referring to FIG. 2, FIG. 2 is a schematic view showing the connection structure of liquid crystal panel and a mold frame according to an embodiment of the present invention.

As shown in FIG. 2, the connection structure 20 of the present embodiment is applied to liquid crystal displaying field. The connection structure 20 comprises a liquid crystal panel 21 and a mold frame 22. The mold frame 22 is for fixing the backlight module (not shown) and carrying the liquid crystal panel 21. In the present embodiment, the mold frame 22 is a rectangular frame, defining an inner space for housing a backlight module. The backlight module comprises a backlight source, a light-guiding plate, a diffuser and a reflector, for providing light source to the liquid crystal panel 21. The mold frame 22 can support and carry the liquid crystal panel 21. The mold frame 22 has four side surfaces, and the four side surfaces of the mold frame 22 are disposed with a plurality of connection elements shown in FIG. 5.

During assembly, the first step is to prepare a backlight module, a liquid crystal panel 21, a mold frame 22 and a plurality of holding members 40 shown in FIG. 4. The side surfaces of the mold frame 22 are disposed with a plurality of connection elements shown in FIG. 5. The mold frame 22 fixes the backlight module, and then the liquid crystal panel 21 is embedded to the mold frame 22. Finally, the plurality of holding members 40 are correspondingly connected to and holding the plurality of connection elements on the side of the mold frame 22.

Referring to FIG. 3, FIG. 3 is a schematic view showing the relation between the holding member 40 and the connection element on the side of the mold frame 22.

As shown in FIG. 3, the positioning hole 425 and the hook opening 424 of the holding member 40 are connected corresponding to the positioning pillar 223 and the hook 222 of the connection element on the side of the mold frame 22. The via hole 423 of the holding member 40 shown in FIG. 4 should overlaps the fixing hole 221 of the connection element on the side of the mold frame 22 shown in FIG. 5. The fixing element 225 passes through via hole 423 and enters fixing hole 221 to fix the two together. As such, with a plurality of holding members 40, the liquid crystal panel 21, the backlight module and the mold frame 22 are assembled to form the connection structure 20 shown in FIG. 2.

In summary, compared to the incapability of the liquid crystal module with front frame for all-in-one PCTV to simplify the assembly structure of the entire liquid crystal module and reduce the assembly cost, the present invention, based on saving the front frame, provides a connection structure for panel and frame, and holding member thereof to fix a liquid crystal panel and a frame of a liquid crystal module to reduce the transportation risk and protect the liquid crystal panel from damage. As such, the present invention simplifies the overall assembly structure of the liquid crystal module as well as reduces the assembly cost.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A connection structure for liquid crystal panel and frame, which comprises: a panel and a frame supporting the panel, characterized in that: the panel and the frame using a plurality of holding members to fix and hold, the holding member comprising a presser and a connection part extending from one side of the presser, the presser fixing and pressing the panel embedded in the frame, and the connection part connecting a corresponding connection element on the side of the frame;

the connection part comprises a first extension part and a second extension part respectively extending from the one side of the presser along different directions, the first extension part is disposed with a via hole, and the second extension part is disposed with a hook opening, the corresponding connection element on the side of the frame correspondingly comprises a fixing hole and a hook, the via hole and the fixing hole are connected through a fixing element sequentially passing through the via hole and then entering the fixing hole, and the hook opening and the hook are correspondingly fixed and connected.

2. The connection structure for liquid crystal panel and frame as claimed in claim 1, characterized in that the first extension part further comprises a positioning hole and the connection element on the side of the frame correspondingly comprises a positioning pillar slightly higher than an upper surface of the frame against the presser, and the positioning pillar and the positioning hole are positioned and connected.

3. The connection structure for liquid crystal panel and frame as claimed in claim 2, characterized in that the first extension part and the presser are at a same level, and the second extension part and the first extension part form a default angle.

4. The connection structure for liquid crystal panel and frame as claimed in claim 3, characterized in that the default angle is between 75°-90°.

5. The connection structure for liquid crystal panel and frame as claimed in claim 1, characterized in that the first extension part and the presser are at a same level, and the second extension part and the first extension part form a default angle.

6. The connection structure for liquid crystal panel and frame as claimed in claim 5, characterized in that the default angle is between 75°-90°.

7. The connection structure for liquid crystal panel and frame as claimed in claim 1, characterized in that the first extension part and the second extension part are spaced from each other.

8. A holding member of a connection structure, for fixing and holding a panel and a frame, characterized in that the holding member comprising: a presser and a connection part extending from one side of the presser, the presser fixing and pressing the panel embedded in the frame, and the connection part connecting a corresponding connection element on the side of the frame;

the connection part comprises a first extension part and a second extension part respectively extending from the one side of the presser alone different directions, the first extension part is disposed with a via hole, and the second extension part is disposed with a hook opening, the corresponding connection element on the side of the frame correspondingly comprises a fixing hole and a hook, the via hole and the fixing hole are connected through a fixing element sequentially passing through the via hole and then entering the fixing hole, and the hook opening and the hook are correspondingly fixed and connected.

9. The holding member as claimed in claim 8, characterized in that the first extension part further comprises a positioning hole and the connection element on the side of the frame correspondingly comprises a positioning pillar slightly higher than an upper surface of the frame against the presser, and the positioning pillar and the positioning hole are positioned and connected.

10. The holding member as claimed in claim 9, characterized in that the first extension part and the presser are at a same level, and the second extension part and the first extension part form a default angle.

11. The holding member as claimed in claim 10, characterized in that the default angle is between 75°-90°.

12. The holding member as claimed in claim 8, characterized in that the first extension part and the presser are at a same level, and the second extension part and the first extension part form a default angle.

13. The holding member as claimed in claim 12, characterized in that the default angle is between 75°-90°.

14. The holding member as claimed in claim 8, characterized in that the first extension part and the second extension part are spaced from each other.

* * * * *